United States Patent
Pfleger

(10) Patent No.: US 9,773,055 B2
(45) Date of Patent: *Sep. 26, 2017

(54) QUERY REWRITING WITH ENTITY DETECTION

(71) Applicant: Google Inc., Mountain View, CA (US)

(72) Inventor: Karl Pfleger, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,499

(22) Filed: May 29, 2015

(65) Prior Publication Data

US 2015/0261848 A1    Sep. 17, 2015

Related U.S. Application Data

(63) Continuation of application No. 13/975,694, filed on Aug. 26, 2013, now Pat. No. 9,047,339, which is a
(Continued)

(51) Int. Cl.
*G06F 17/30* (2006.01)

(52) U.S. Cl.
CPC .. *G06F 17/30648* (2013.01); *G06F 17/30401* (2013.01); *G06F 17/30448* (2013.01); *G06F 17/30646* (2013.01); *G06F 17/30864* (2013.01)

(58) Field of Classification Search
None
See application file for complete search history.

(56) References Cited

U.S. PATENT DOCUMENTS 5,555,408 A    9/1996  Fujisawa et al.
5,640,553 A    6/1997  Schultz
(Continued)

FOREIGN PATENT DOCUMENTS

DE    101 34 128    9/2002
EP    1 160 686    12/2001

OTHER PUBLICATIONS

J. Jargon, "Gasp Python Course", May 27, 2008, 5 pages.
(Continued)

*Primary Examiner* — Syed Hasan
(74) *Attorney, Agent, or Firm* — Middleton Reutlinger

(57) ABSTRACT

A system determines whether a received search query includes an entity name, determines whether to rewrite the received search query based on information relating to prior searches involving the entity name, and rewrites the received search query when it is determined that the received search query should be rewritten. The system further determines whether to provide a suggestion of rewriting the received search query, as a rewriting suggestion, based on information relating to prior searches involving the entity name when it is determined that the received search query should not be rewritten. The system also generates the rewriting suggestion when it is determined that the rewriting suggestion should be provided. The system performs a search based on one of the received search query and the rewritten search query to obtain search results, presents the search results, and presents the rewriting suggestion when it is determined that the rewriting suggestion should be provided.

11 Claims, 19 Drawing Sheets

Related U.S. Application Data continuation of application No. 13/183,192, filed on Jul. 14, 2011, now Pat. No. 8,521,764, which is a continuation of application No. 10/813,359, filed on Mar. 31, 2004, now Pat. No. 7,996,419.

(56) References Cited

U.S. PATENT DOCUMENTS

| | | | |
|---|---|---|---|
| 5,675,819 | A | 10/1997 | Schuetze |
| 5,765,147 | A | 6/1998 | Mattos et al. |
| 5,771,378 | A | 6/1998 | Holt et al. |
| 5,797,136 | A | 8/1998 | Boyer et al. |
| 6,006,225 | A * | 12/1999 | Bowman ........... G06F 17/30395 |
| 6,134,540 | A | 10/2000 | Carey et al. |
| 6,151,624 | A | 11/2000 | Teare et al. |
| 6,185,558 | B1 | 2/2001 | Bowman et al. |
| 6,230,158 | B1 | 5/2001 | Burrows |
| 6,397,211 | B1 | 5/2002 | Cooper |
| 6,411,950 | B1 | 6/2002 | Moricz et al. |
| 6,418,434 | B1 | 7/2002 | Johnson et al. |
| 6,424,980 | B1 | 7/2002 | Iizuka et al. |
| 6,460,029 | B1 | 10/2002 | Fries et al. |
| 6,564,210 | B1 | 5/2003 | Korda et al. |
| 6,564,213 | B1 | 5/2003 | Ortega et al. |
| 6,578,022 | B1 | 6/2003 | Foulger et al. |
| 6,615,209 | B1 | 9/2003 | Gomes et al. |
| 6,671,681 | B1 | 12/2003 | Emens et al. |
| 6,735,585 | B1 | 5/2004 | Black et al. |
| 6,772,150 | B1 | 8/2004 | Whitman et al. |
| 6,931,401 | B2 | 8/2005 | Gibson et al. |
| 7,146,375 | B2 | 12/2006 | Egilsson et al. |
| 7,165,063 | B2 | 1/2007 | Beyer et al. |
| 7,333,976 | B1 | 2/2008 | Auerbach et al. |
| 7,379,933 | B1 | 5/2008 | Witkowski et al. |
| 7,409,383 | B1 | 8/2008 | Tong et al. |
| 7,536,382 | B2 | 5/2009 | Zhou et al. |
| 7,630,986 | B1 | 12/2009 | Herz et al. |
| 7,996,419 | B2 | 8/2011 | Pfleger |
| 8,112,432 | B2 | 2/2012 | Zhou et al. |
| 8,521,764 | B2 | 8/2013 | Pfleger |
| 9,047,339 | B2 | 6/2015 | Pfleger |
| 2001/0037329 | A1 | 11/2001 | Huffman et al. |
| 2002/0002552 | A1 | 1/2002 | Schultz et al. |
| 2002/0099694 | A1 | 7/2002 | Diamond et al. |
| 2002/0099720 | A1 | 7/2002 | Bansal |
| 2002/0111945 | A1 | 8/2002 | Young et al. |
| 2002/0120712 | A1 | 8/2002 | Maislin |
| 2002/0129026 | A1 | 9/2002 | Reardon |
| 2002/0161752 | A1 | 10/2002 | Hutchison |
| 2002/0169595 | A1 | 11/2002 | Agichtein et al. |
| 2003/0033324 | A1 | 2/2003 | Golding |
| 2003/0046311 | A1 | 3/2003 | Baidya et al. |
| 2003/0055831 | A1 | 3/2003 | Ryan et al. |
| 2003/0088547 | A1 | 5/2003 | Hammond |
| 2003/0145004 | A1 | 7/2003 | Egilsson et al. |
| 2003/0233224 | A1 | 12/2003 | Marchisio et al. |
| 2004/0225681 | A1 | 11/2004 | Chaney et al. |
| 2004/0236736 | A1 | 11/2004 | Whitman et al. |
| 2005/0021553 | A1 * | 1/2005 | Romijn ............. G06F 17/30646 |
| 2005/0033711 | A1 | 2/2005 | Horvitz et al. |
| 2005/0071255 | A1 | 3/2005 | Wang et al. |
| 2005/0131872 | A1 * | 6/2005 | Calbucci ........... G06F 17/30672 |
| 2005/0149507 | A1 | 7/2005 | Nye |
| 2005/0222975 | A1 | 10/2005 | Nayak et al. |
| 2006/0282412 | A1 | 12/2006 | Getchius |
| 2009/0254971 | A1 | 10/2009 | Herz et al. |
| 2012/0136885 | A1 | 5/2012 | Zhou et al. |

OTHER PUBLICATIONS

"Google News Loses Functionality", Search Engine Watch, Mar. 25, 2003, http://www.searchengineshowdown.com/blog/2003/03/google_news_loses_functionalit.shtml, 1 page.

"Northern Light" as archived Feb. 7, 2003 on archive.org, 1 page.

Calishain et al., "Google Hacks", O'Reilly, Feb. 2003, pp. 6, 42 and 53-54.

Paul Thompson et al., "Name Searching and Information Retrieval", Proceedings of the Second Conference on Empirical Methods in Natural Language Processing, Association for Computational Linguistics, Somerset, New Jersey, 1997, 134-140.

Eduard Hovy et al., "The Use of External Knowledge in Factoid QA", Proceedings of the TREC-10 Conference, Nov. 2001, 9 pages.

Shumeet Baluja et al., "Applying Machine Learning for High Performance Named-Entity Extraction", Pacific Association for Computational Linguistics, 1999, 14 pages.

International Search Report corresponding to PCT/US2005/010701, mailed Oct. 11, 2005, 6 pages.

International Search Report corresponding to PCT/US2005/010701, mailed Jul. 5, 2005 3 pages.

"Northern Light Business Search", as archived Feb. 5, 2003, http://webarchive.org/web/20030205105021/www.northernlight.com/business.html, 1 page.

European Patent Office; Communication Pursuant to Article 94(3) EPC, 13 pages, dated Dec. 2, 2016.

* cited by examiner

Froogle BETA

[ harry potter store:amazon ]  [ SEARCH FROOGLE ]

SEARCHED PRODUCTS FOR HARRY POTTER AT AMAZON.COM

SEARCH PRODUCTS FOR HARRY POTTER AMAZON ~ 1150

LEGO Harry Potter: Dumbledore's Office (4729) ~ 1110
$39.98 - Amazon.com - Blocks & Construction ~ 1120
... Connect Dumbledore's Office to your Hogwarts Castle set for the complete Harry Potter experience! ~ 1130
Includes Professor Dumbledore, Professor . . .

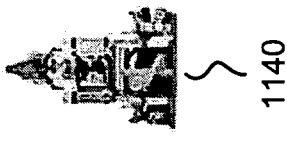 ~ 1140

LEGO Harry Potter Escape from Private Drive
$18.74 - Amazon.com - Blocks & Construction
... Attach the string on the rear of the car to the window and pull it free so Harry can escape. Includes Harry Potter, Ron Weasley, and Uncle Vernon Dursley.

FIG. 11

Froogle BETA

[ purse coach ]  [SEARCH FROOGLE]

---
SEARCHED PRODUCTS FOR PURSE COACH
---
SEARCH MERCHANT COACH FOR PURSE  ～1310

Coach Mini Signature Bucket Tote Purse Khaki  ～1320
$44.99 - Yahoo! Auctions - Women's Accessories  ～1330
Brand New COACH mini Signature Bucket Tote Purse in  ～1340
Khaki color. The size of this gorgeous purse is 10.5" x 8"
x 5", and the adjustable ...
[More from Yahoo! Auctions]  ～1350

1140

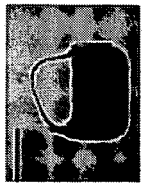

Coach black signature demi purse
$50.00 - Vendio - Women's Accessories
This is a black Coach signature demi purse. There are
no guarantees on this item -- I never went and checked
to see if it really ...
[More from Vendio]

FIG. 13

Froogle BETA

[ purse store:coach ]  [ SEARCH FROOGLE ]

SEARCHED PRODUCTS FOR PURSE AT COACH

SEARCH PRODUCTS FOR PURSE COACH ~ 1450

Coach Purse Pen ~ 1410
$38.00 - Coach - Women's Accessories ~ 1420
This colorful enamel pen comes with a leather strap that ~ 1430
can be clipped into a handbag. 4" enamel pen. 10 1/4"
calfskin wrist strap with dogleash closure.

COACH Women's Wallet Polished Calfskin Elongated French Purse
$198.00 - Coach - Women's Accessories
A chic addition to your handbag. Ten credit card
pockets. Three multi-function pockets. Outside gusseted
zip coin compartment. Double bill compartments.

| george bush source:washington_post | SEARCH NEWS |

SEARCHED NEWS SOURCE WASHINGTON POST FOR GEORGE BUSH

SEARCH NEWS GEORGE BUSH WASHINGTONPOST — 1650

Bush: Hussein Eluded Containment Efforts — 1610
Washington Post, DC - 10 hours ago
In defending his decision to go to war in Iraq, President Bush suggested yesterday a belief that UN inspections and sanctions were of limited utility in . . . .
Bush Offers Shifting Rationale for Iraq War - Washington Post — 1620
President Revises Rationale for War - Washington Post — 1630
and more >>

Bush Offers Defense of Iraq War Rationale
Washington Post, DC - 23 hours ago
. . . Bush said he decided to go to war based on the intelligence he had at hand about Saddam, but said CIA Director George Tenet's job is not in jeopardy. . . . .
Bush, Aides Ignored CIA Caveats - Washington Post  ⎫
Imminent Danger at the CIA - Washington Post  ⎬ — 1640
and more >>  ⎭

FIG. 16

QUERY REWRITING WITH ENTITY DETECTION

RELATED APPLICATIONS

This application is a continuation of U.S. patent application Ser. No. 13/975,694, filed Aug. 26, 2013 (now U.S. Pat. No. 9,047,339), which is a continuation of U.S. patent application Ser. No. 13/183,192, filed Jul. 14, 2011 (now U.S. Pat. No. 8,521,764), which is a continuation of U.S. patent application Ser. No. 10/813,359, filed Mar. 31, 2004 (now U.S. Pat. No. 7,996,419), the disclosures of which are incorporated herein by reference.

BACKGROUND OF THE INVENTION

Field of the Invention

Systems and methods consistent with the principles of the invention relate generally to information retrieval and, more particularly, to rewriting of search queries based on detection of the names of certain entities in the queries.

Description of Related Art

The World Wide Web ("web") contains a vast amount of information. Search engines assist users in locating desired portions of this information by cataloging web documents. Typically, in response to a user's request, a search engine returns links to documents relevant to the request.

Search engines may base their determination of the user's interest on search terms (called a search query) provided by the user. The goal of a search engine is to identify links to relevant results based on the search query. Typically, the search engine accomplishes this by matching the terms in the search query to a corpus of pre-stored web documents. Web documents that contain the user's search terms are considered "hits" and are returned to the user.

Some search engines permit a user to restrict a search to a set of related documents, such as documents associated with the same web site, by including special characters or terms in the search query. Oftentimes, however, users forget to include these special characters/terms or do not know about them.

SUMMARY OF THE INVENTION

According to one aspect consistent with the principles of the invention, a method may include receiving a search query, determining whether the received search query includes an entity name, determining whether to rewrite the received search query based on information relating to prior searches involving the entity name, and rewriting the received search query when it is determined that the received search query should be rewritten. The method may also include performing a search based on one of the received search query and the rewritten search query to obtain search results and presenting the search results.

According to another aspect, a system may include a memory and a processor. The memory may store information relating to prior searches. The processor may receive a search query, determine whether the received search query includes an entity name, determine whether to provide a suggestion of rewriting the received search query, as a rewriting suggestion, based on the information in the memory, and generate the rewriting suggestion when it is determined that the rewriting suggestion should be provided. The processor may also perform a search based on the received search query to obtain search results, present the search results, and provide the rewriting suggestion when the rewriting suggestion should be provided.

According to yet another aspect, a system may include a memory and a processor. The memory may store information relating to prior searches. The processor may identify an entity name, generate variations of the entity name, and evaluate each of the variations of the entity name based on information relating to prior searches to determine whether to include the variations of the entity name in a table. The processor may use the table to rewrite a search query prior to performing a search based on the search query.

According to a further aspect, a method may include obtaining an entity name, generating variations of the entity name, evaluating each of the variations of the entity name based on information relating to prior searches, and determining whether to include the variations of the entity name in a table. The method may also include receiving a search query that includes one of the variations of the entity name, determining whether the one variation of the entity name is included in the table, and suggesting a different search query for the received search query when the one variation of the entity name is included in the table.

According to another aspect, a method may include receiving a search query and determining whether the received search query includes an entity name. The method may also include determining whether to rewrite the received search query based on information relating to prior searches involving the entity name and rewriting the received search query when it is determined that the received search query should be rewritten. The method may further include determining whether to provide a suggestion of rewriting the received search query, as a rewriting suggestion, based on information relating to prior searches involving the entity name when it is determined that the received search query should not be rewritten and generating the rewriting suggestion when it is determined that the rewriting suggestion should be provided. The method may also include performing a search based on one of the received search query and the rewritten search query to obtain search results, presenting the search results, and presenting the rewriting suggestion when it is determined that the rewriting suggestion should be provided.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 10 and 11 are diagrams of an automatic query rewrite example in a store context according to an implementation consistent with the principles of the invention;

FIGS. 12-14 are diagrams of a query rewrite suggestion example in the store context according to an implementation consistent with the principles of the invention;

FIGS. 15 and 16 are diagrams of an automatic query rewrite example in a news context according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Systems and methods consistent with the principles of the invention may rewrite search queries or generate suggestion links to rewritten search queries upon detection of the names of certain entities. An "entity," as used herein, may refer to anything that can be tagged as being associated with certain documents. Examples of entities may include stores, such as online stores, news sources, product categories, brands or manufacturers, specific product models, condition (e.g., new, used, refurbished, etc.), authors, artists, people, places, and organizations.

Some entity names are unambiguous and uniquely identify particular entities. A large number of names, however, are somewhat ambiguous or generic, making it more difficult to identify the entities to which they are intended to correspond when included in users' search queries. Systems and methods consistent with the principles of the invention provide mechanisms for determining the entities to which entity names correspond and rewriting users' search queries or suggesting rewriting of the users' search queries when the names are determined to correspond to the entities. Accordingly, a user's search query may be restricted to a search of document(s) associated with the entity that the user intended in the search.

Exemplary Network Configuration

Figure 1:
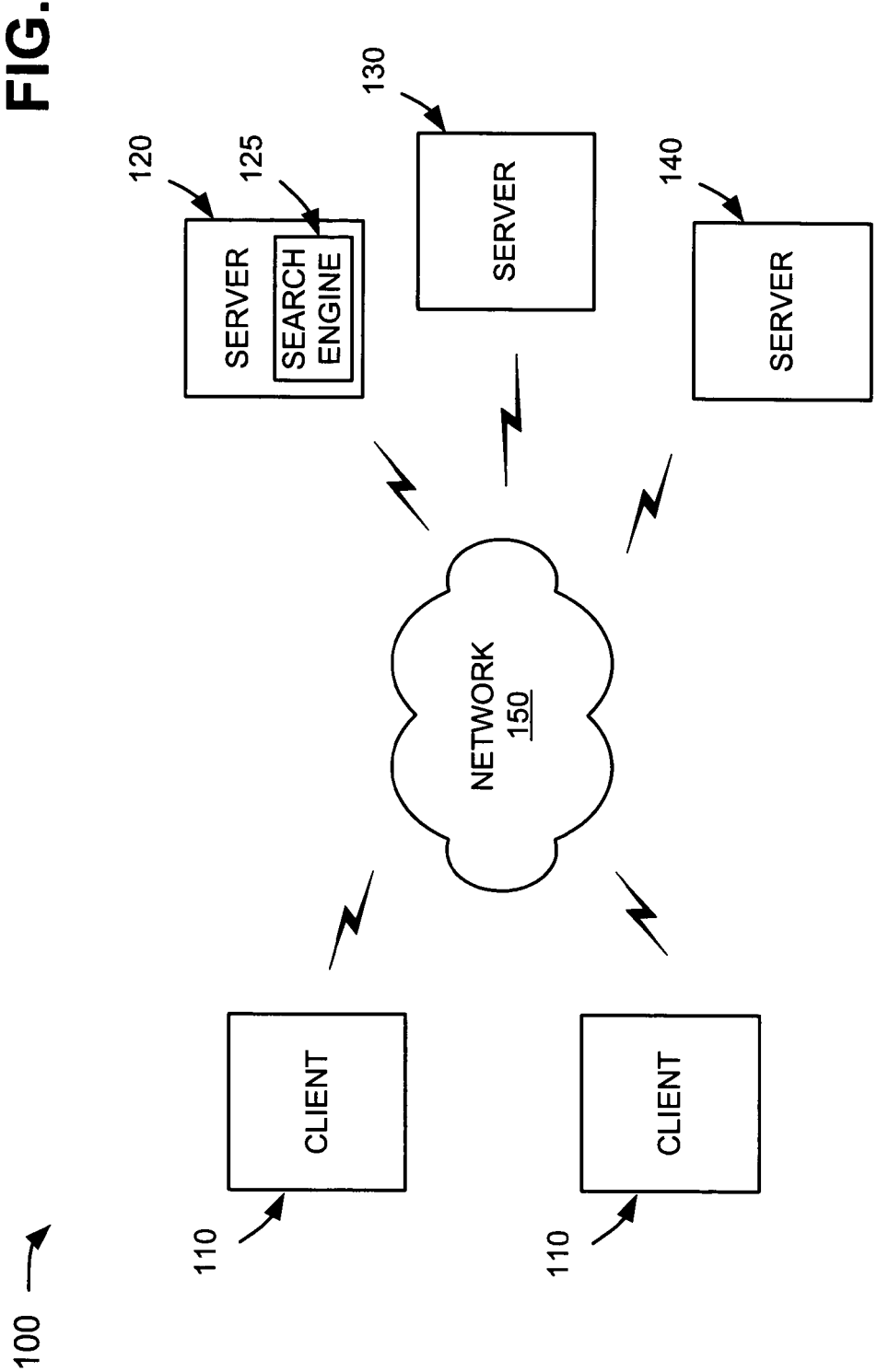
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client components. A component may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server components that gather, process, search, and/or maintain documents in a manner consistent with the principles of the invention. Clients 110 and servers 120-140 may connect to network 150 via wired, wireless, and/or optical connections.

In an implementation consistent with the principles of the invention, server 120 may include a search engine 125 usable by clients 110. Server 120 may crawl a corpus of documents (e.g., web pages), index the documents, and store information associated with the documents in a repository of crawled documents. Servers 130 and 140 may store or maintain documents that may be crawled by server 120. While servers 120-140 are shown as separate components, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

A "document," as the term is used herein, is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.).

Exemplary Client/Server Architecture

Figure 2:
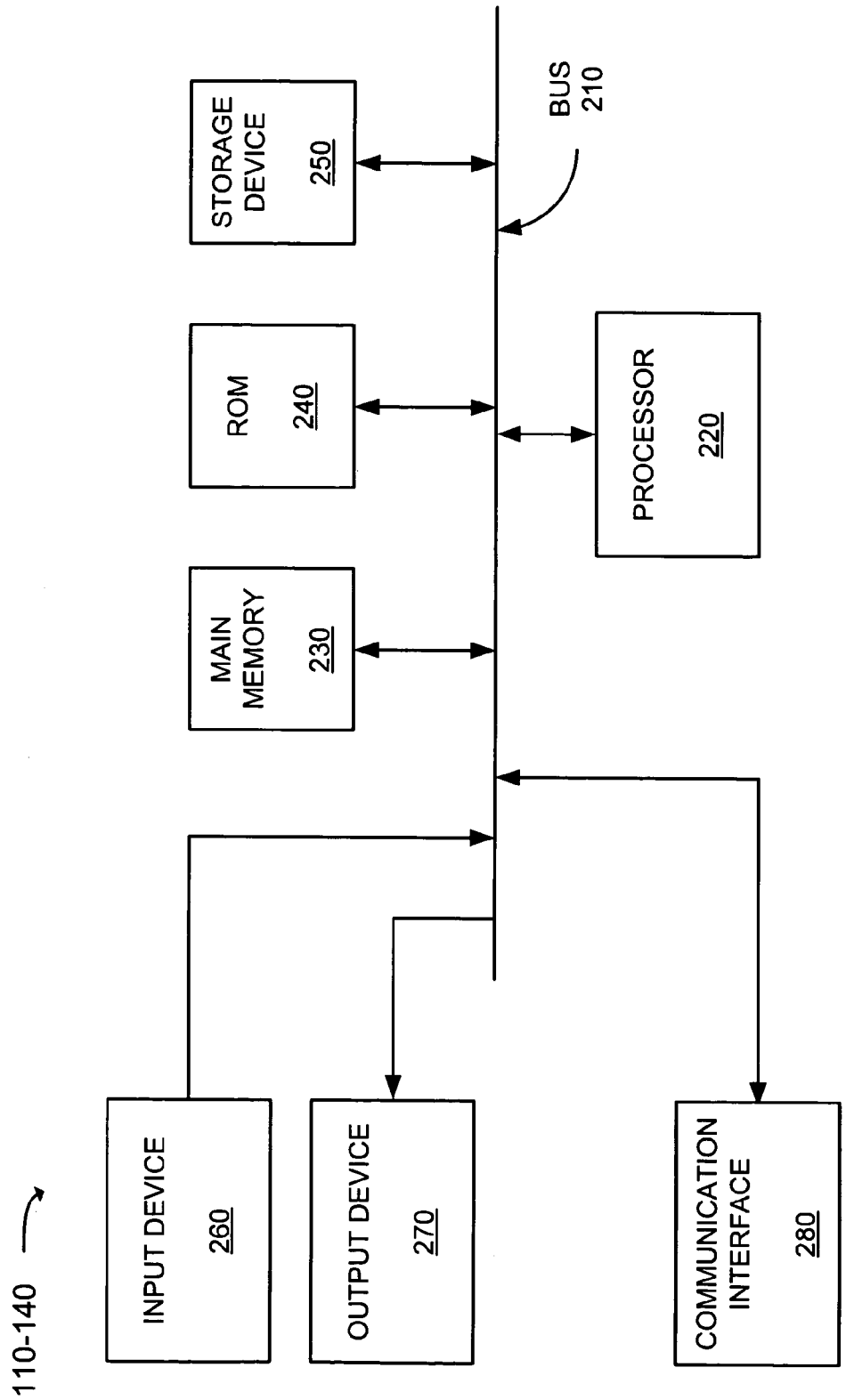
FIG. 2 is an exemplary diagram of a client and/or server of FIG. 1 according to an implementation consistent with the principles of the invention.

FIG. 2 is an exemplary diagram of a client or server component (hereinafter called "client/server component"), which may correspond to one or more of clients 110 and servers 120-140, according to an implementation consistent with the principles of the invention. The client/server component may include a bus 210, a processor 220, a main memory 230, a read only memory (ROM) 240, a storage device 250, an input device 260, an output device 270, and a communication interface 280. Bus 210 may include a set of conductors that permit communication among the elements of the client/server component.

Processor 220 may include a conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to the client/server component, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server component to communicate with other devices and/or systems. For example, communication interface 280 may include mechanisms for communicating with another device or system via a network, such as network 150.

As will be described in detail below, the client/server component, consistent with the principles of the invention, perform certain searching-related operations. The client/server component may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Server

Figure 3:
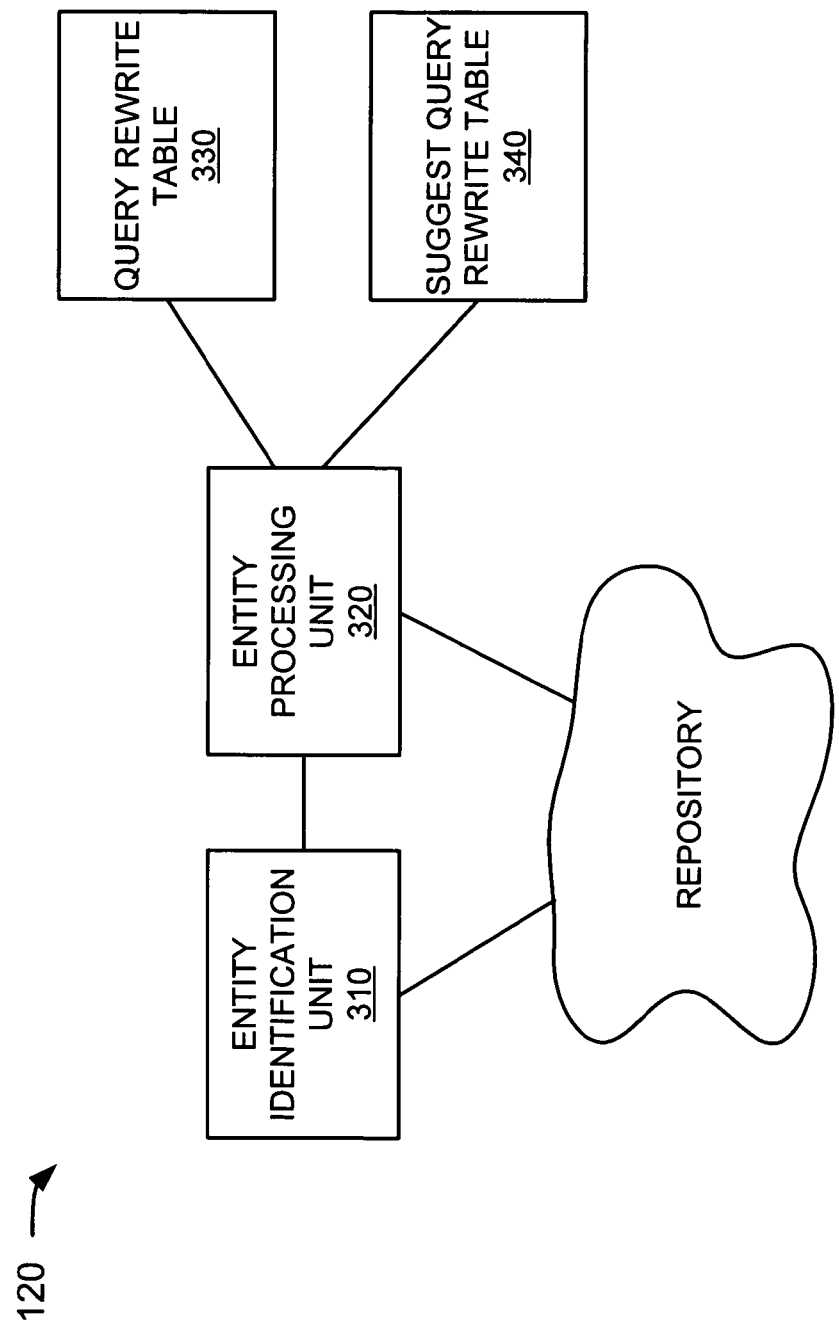
FIG. 3 is an exemplary functional block diagram of a portion of a server of FIG. 1 according to an implementation consistent with the principles of the invention.

FIG. 3 is an exemplary functional block diagram of a portion of server 120 according to an implementation consistent with the principles of the invention. According to one implementation, one or more of the functions described below may be performed by search engine 125. According to another implementation, one or more of these functions may be performed by a component external to server 120, such as a computer associated with server 120 or one of servers 130 and 140.

Server 120 may include an entity identification unit 310 and an entity processing unit 320 connected to a repository. The repository may include information associated with documents that were previously crawled and stored, for example, by server 120. The repository may also store information associated with the behavior of users with regard to previously-performed searches. For example, the repository may store a query log that describes the searches that users have done in the past, the results that they selected (e.g., by clicking), and possibly other user behavior relating to this searching.

Figure 4:
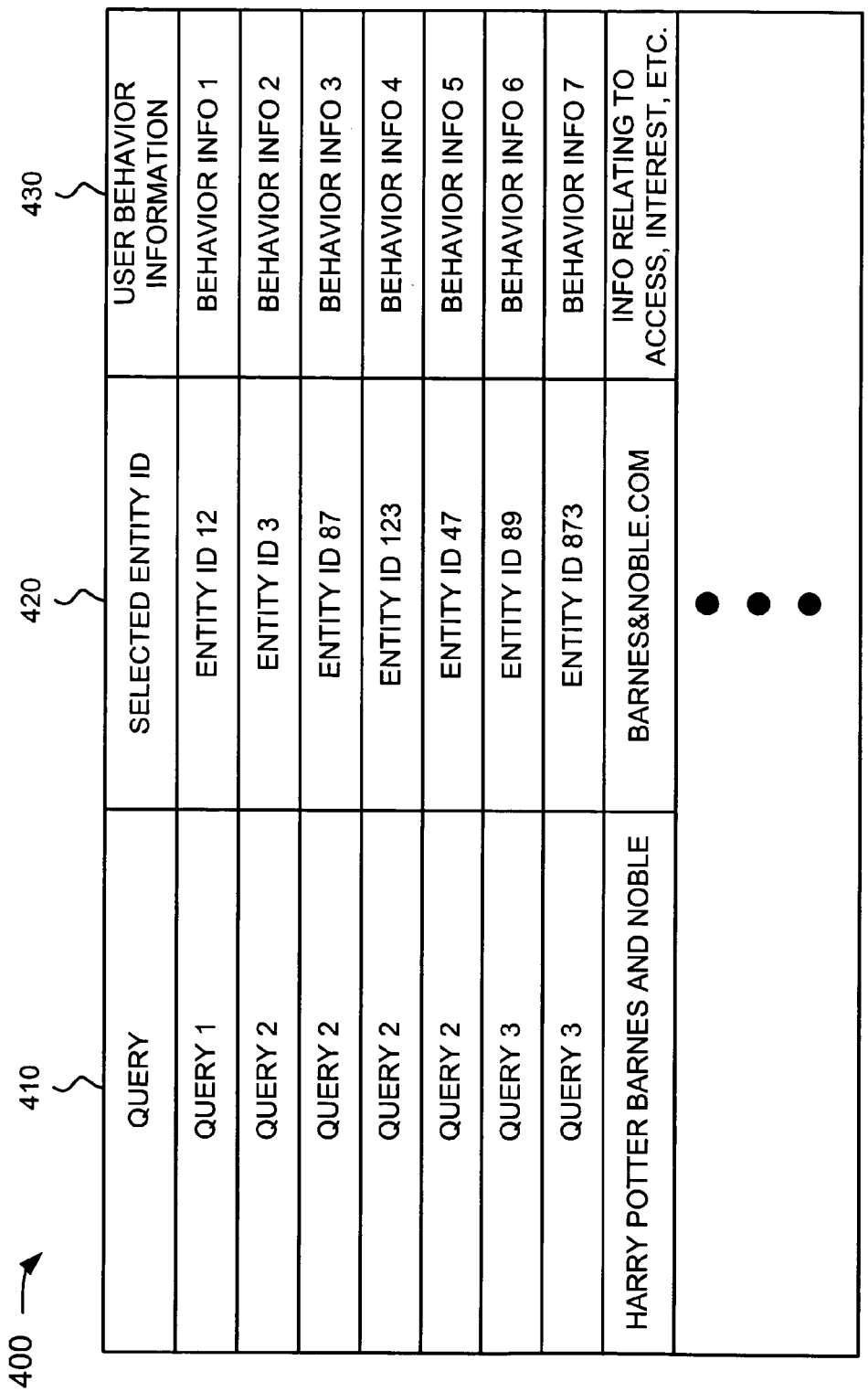
FIG. 4 is an exemplary diagram of a query log according to an implementation consistent with the principles of the invention.

FIG. 4 is an exemplary diagram of a query log 400 that may be stored in the repository according to an implementation consistent with the principles of the invention. Query log 400 may include a number of entries associated with previously-performed searches. An entry in query log 400 might include a query field 410, a selected entity identifier (ID) field 420, and possibly a user behavior information field 430. Query field 410 may store information relating to the term(s) included in a search query entered by a user. Selected entity ID field 420 may store information that may uniquely identify a particular entity, such as a domain (or hostname or Uniform Resource Locator (URL)), a category identifier, a product identifier, etc., associated with a document that was selected by the user from the results of a search performed using the search query. User behavior information field 430 may store information relating to the user's access of a document associated with the entity, such as information that may tend to show the user's interest in the entity. Because a user may select more than one result associated with a search query, the same search query may appear in multiple entries in query log 400 (e.g., query 2).

An example of an entry in query log 400 might include "harry potter barnes and noble" for query field 410 and the domain "barnesandnoble.com" for selected entity ID field 420. User behavior information field 430 might store information relating to the amount of time that the user spent accessing the barnesandnoble.com domain, whether a conversion occurred (i.e., whether a subsequent purchase on barnesandnoble.com occurred), whether a partial conversion occurred (i.e., whether the user got as far as adding an item to a shopping cart on the barnesandnoble.com domain), and/or other information that may tend to show the user's interest in the barnesandnoble.com domain.

Returning to FIG. 3, entity identification unit 310 may generate a list of entity names. Entity identification unit 310 may obtain an initial set of entity names for entities in a particular context (e.g., store names in the store context or names of news sources in the news source context). There are many ways that entity identification unit 310 can obtain the initial set of entity names in a particular context. For example, entity identification unit 310 may obtain entity names from online directories, lists, group postings, by analyzing a corpus of documents, etc.

For each of these names, entity identification unit 310 may also identify an entity identifier, such as a homepage domain name or a category identifier, associated with the name. For example, if the name was Barnes & Noble, then the associated entity identifier might be barnesandnoble.com. Entity identification unit 310 may identify the associated entity identifier from, for example, an analysis of the document information in the repository.

Entity identification unit 310 may then process the entity names to produce a list of variations of the names. Entity identification unit 310 may apply several transformations to the name and its entity identifier, such as: using the entity name as is; using the entity identifier as is; removing modifiers, such as "a," "the," "inc," "inc.," "co," and "co." from the entity name; replacing spaces with hyphens or underscores, or vice versa, within the entity name; removing apostrophes from the entity name; interchanging "and" and "&" in the entity name and/or the entity identifier; removing "and" and "&" from the entity name and/or the entity identifier; removing the initial "www." and/or the trailing ".com" from the entity identifier; and/or treating periods in the entity identifier with no spaces on either side of them as spaces or deleting the periods. Other or different transformations may also be used.

Figure 5:
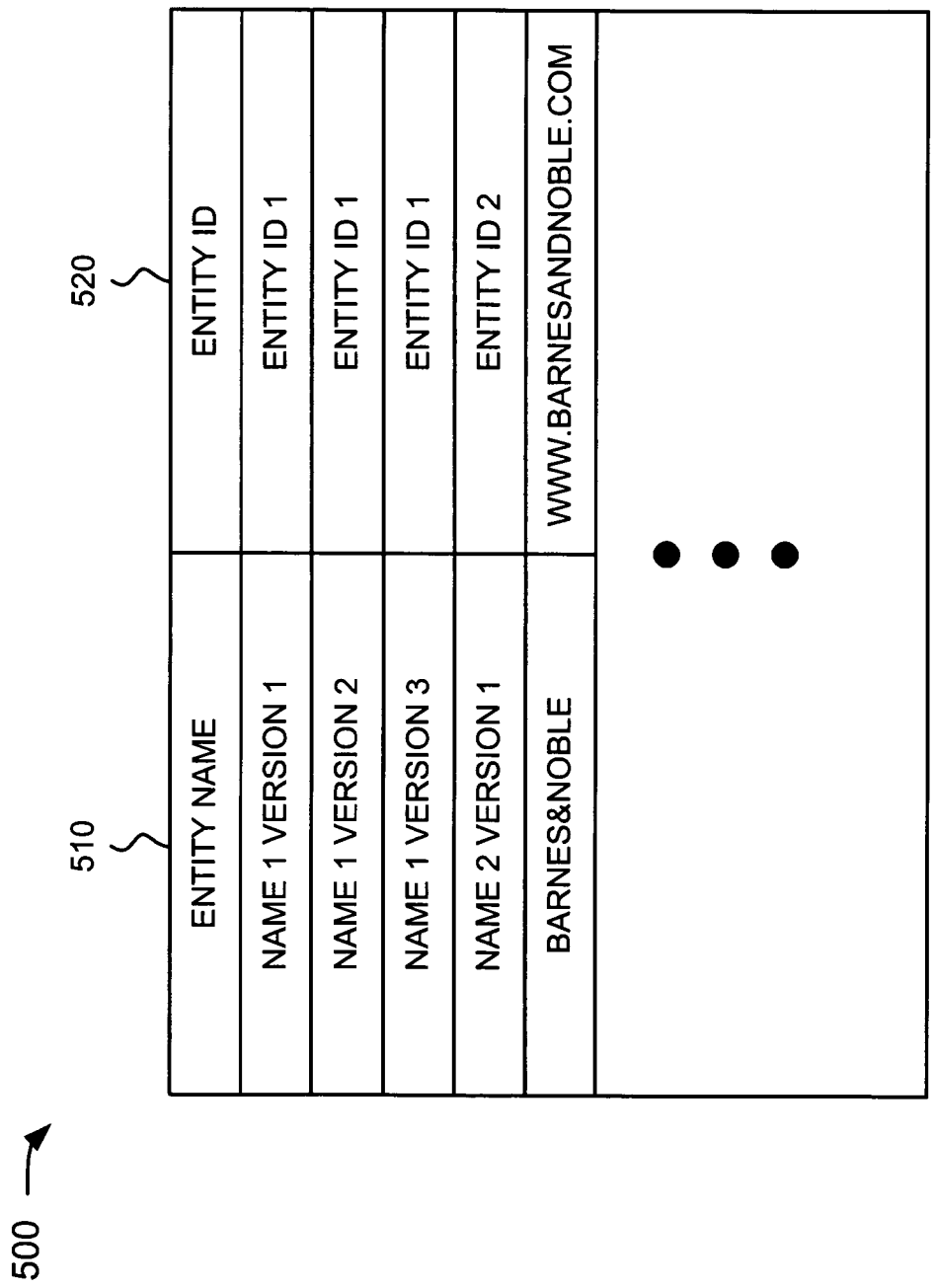
FIG. 5 is an exemplary diagram of a list of candidate strings according to an implementation consistent with the principles of the invention.

Entity identification unit 310 may form these name variations into a list of candidate strings. FIG. 5 is an exemplary diagram of a list of candidate strings 500 according to an implementation consistent with the principles of the invention. Candidate string list 500 might include a number of entries (candidate strings) associated with the various versions of entity names and their associated entity identifiers. An entry in list 500 might include an entity name field 510 and an entity ID field 520. Entity name field 510 may include a variation of an entity name or its associated entity identifier. Entity ID field 520 may include information that uniquely identifies the entity corresponding to the entity name in entity name field 510, such as a domain, a URL, or a category identifier. An example of an entry for Barnes & Noble might include "barnes&noble" in entity name field 510 and "www.barnesandnoble.com" in entity ID field 520.

Returning to FIG. 3, entity processing unit 320 may process the list of candidate strings to generate two tables: query rewrite table 330 and suggest query rewrite table 340. As described in more detail below, query rewrite table 330 may indicate whether a search query should be automatically rewritten and suggest query rewrite table 340 may indicate whether rewriting of a query should be suggested.

Entity processing unit 320 may evaluate each candidate string (i.e., each version of an entity name and/or entity identifier) using query log 400 (FIG. 4). For example, entity processing unit 320 may examine query log 400 to identify all search queries that include a candidate string. Entity processing unit 320 may then examine the clicks associated with the identified queries. For example, entity processing unit 320 may analyze the entity identifiers associated with documents that were selected by the users (e.g., by clicking) in association with the identified queries.

Entity processing unit 320 may then analyze the distribution of the clicks. For example, entity processing unit 320 may determine whether the most-clicked entity identifier is the entity identifier that is supposed to correspond to this candidate string. If not, entity processing unit 320 may ignore this candidate string and select the next candidate string to evaluate.

If the most-clicked entity identifier is the entity identifier that is supposed to correspond to this candidate string, entity processing unit 320 may determine whether the total number of clicks to the correct, most-clicked entity identifier exceeds a small threshold (e.g., 5). Using this threshold ensures that this candidate string is common enough to justify rewriting it as opposed to a fluke that one user clicked on once. If the total number of clicks is below the threshold, entity processing unit 320 may ignore this candidate string and select the next candidate string to evaluate.

If the correct, most-clicked entity identifier has a total number of clicks above the threshold, entity processing unit 320 may analyze the distribution of how many clicks were associated with each entity identifier. If the distribution is "peaked" enough in a statistical sense (e.g., most of the clicks were to the correct entity identifier and far fewer clicks were to other entity identifiers), then entity processing unit 320 may add the candidate string to query rewrite table 330. If, on the other hand, the distribution is not peaked, but falls off much more slowly (e.g., other entity identifiers got nearly as many clicks), entity processing unit 320 may add the candidate string to suggest query rewrite table 340.

Many possible tests for peakedness could be used, including information theoretic measures like the entropy of the distribution (treated as a multinomial distribution). For efficiency and simplicity, a simple test could be used, such as if the number of clicks to the correct, most-clicked entity identifier exceeds the combined number of clicks to the next most frequently clicked N entity identifiers (e.g., N=4), then it is peaked enough to add to query rewrite table 330.

In addition to the total number of clicks, other data in query log 400 may be used to determine peakedness, such as information in user behavior information field 430. For example, information relating to the amount of time that the users spent accessing documents associated with the entities, whether full or partial conversions occurred, and/or other information that may tend to show the users' interest in the entities may be factors in determining peakedness. Any of this data that tends to indicate a desired result could be associated with a continuous weight. For example, multiple of these could be used together and assigned a weight (e.g., a conversion could be weighted more than a partial conversion, which may be weighted more than a click). Alternatively, clicks may be weighted variable amounts depending on the amount of time that the users spent accessing documents associated with the entities or certain categories relating to the amount of time that the users spent accessing the documents associated with the entities. Then, the peakedness may be based on the overall weighted measure.

An advantage of this technique is that it directly captures what the users meant when they provided the search query. For example, Amazon.com is a commonly used store, but it is also a river in South America. If a vast majority of users only ever mean the store when they include it in a search query, it will be added to query rewrite table 330. If a significant fraction of the users mean the river or something else, they will click on other results and the distribution will not be peaked enough to add Amazon to query rewrite table 330. In this case, Amazon may be added to suggest query rewrite table 340.

Figure 6:
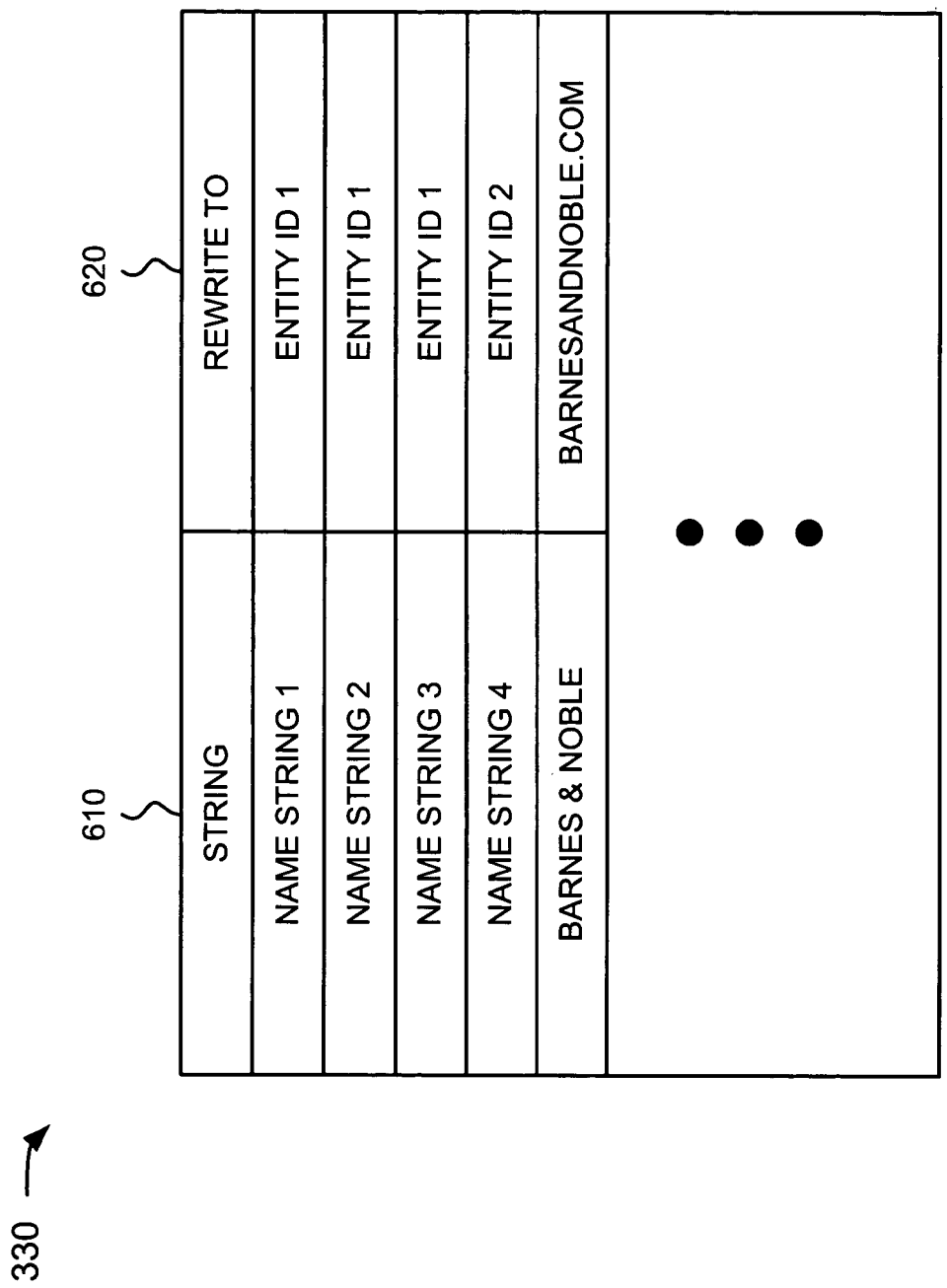
FIG. 6 is an exemplary diagram of the query rewrite table of FIG. 3 according to an implementation consistent with the principles of the invention.

Query rewrite table 330 may store information relating to entities whose names are unambiguous (i.e., it is fairly certain that their names correspond to the entities and nothing else, such as "barnes and noble"). FIG. 6 is an exemplary diagram of query rewrite table 330 according to an implementation consistent with the principles of the invention. Query rewrite table 330 may include a number of entries associated with name strings, which if they appear in a user search query, may be automatically rewritten to a particular entity identifier (e.g., domain, URL, or category identifier). An entry in query rewrite table 330 might include a string field 610 and a rewrite to field 620. String field 610 may store candidate strings as described above. Rewrite to field 620 may store an entity identifier to which the candidate string may be rewritten. For example, if a user search query includes "barnes & noble," then, based on query rewrite table 330, the query may be rewritten to "store: barnesandnoble" to indicate that the search is to be restricted to the entity identifier (domain) associated with the store Barnes & Noble. The "store:" may correspond to a restrict identifier in the store context that indicates that the search should be restricted to the store that follows it. Similar restrict identifiers may be used in other contexts.

Figure 7:
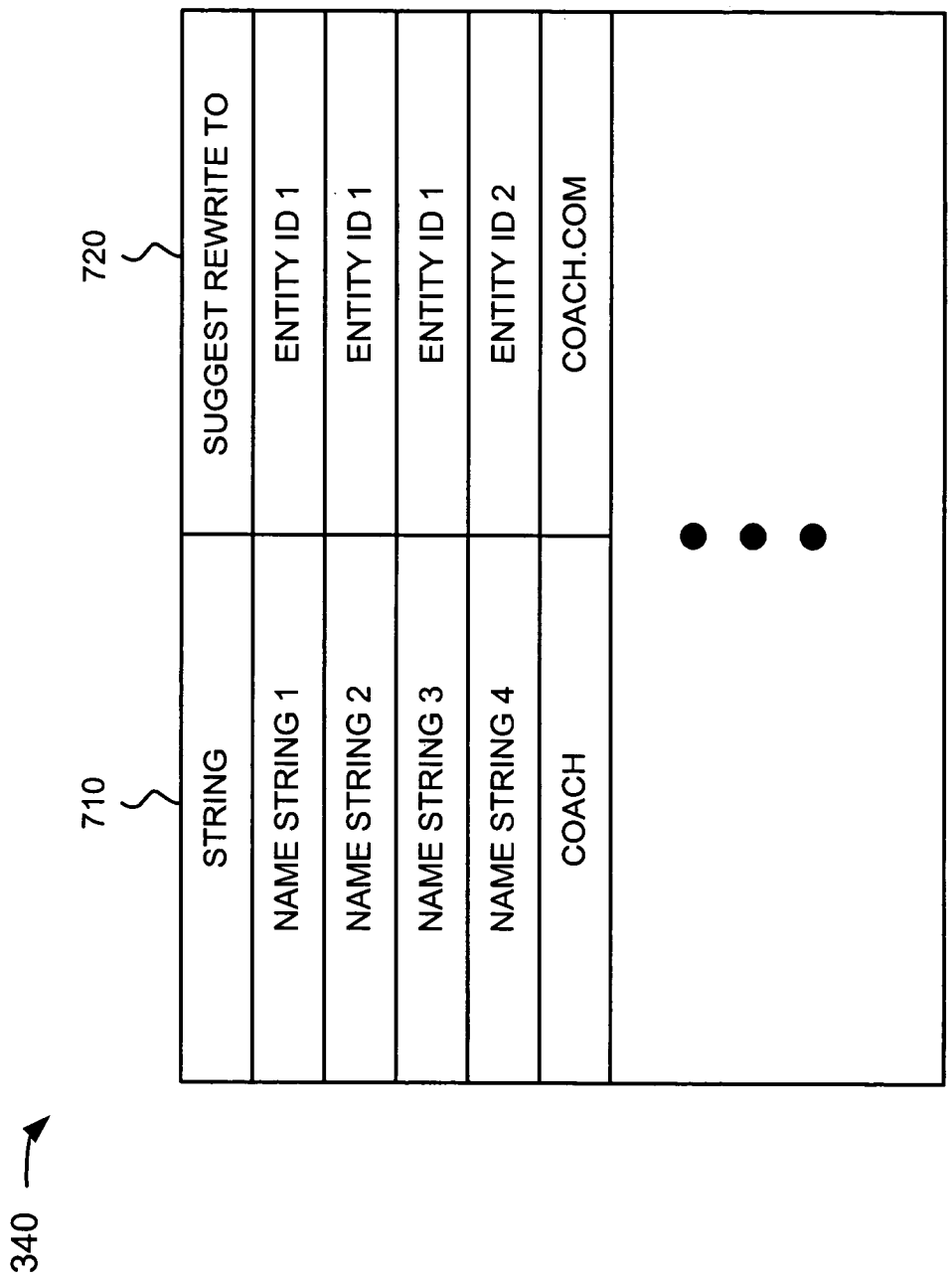
FIG. 7 is an exemplary diagram of the suggest query rewrite table of FIG. 3 according to an implementation consistent with the principles of the invention.

Suggest query rewrite table 330 may store information relating to entities whose names are ambiguous (i.e., the names may contain generic words that can have other meaning, such as "coach" that has several uses other than referring to the store Coach.com). FIG. 7 is an exemplary diagram of suggest query rewrite table 340 according to an implementation consistent with the principles of the invention. Suggest query rewrite table 340 may include a number of entries associated with name strings for which, if they appear in a user search query, a link to a particular entity identifier (e.g., domain, URL, or category identifier) may be suggested. An entry in suggest query rewrite table 340 might include a string field 710 and a suggest rewrite to field 720. String field 710 may store candidate strings as described above. Suggest rewrite to field 720 may store an entity identifier to which a link may be suggested for the candidate string. For example, if a user search query includes "coach," then, based on suggest query rewrite table 340, a link may be generated to rewrite the search query to "store:coach" to indicate that the search is to be restricted to the entity identifier (domain) associated with the store Coach.

In one implementation, query rewrite table 330 and suggest query rewrite table 340 may be human-evaluated after they are generated. This may help new entities get placed in the correct table. Further, tables 330 and 340 may be periodically updated. It may be desirable to weight the user behavior (e.g., clicks) differently when updating tables 330 and 340 since the users' behavior may be influenced by the automatic query rewriting, as described in detail below.

Exemplary Processing

Figure 8:
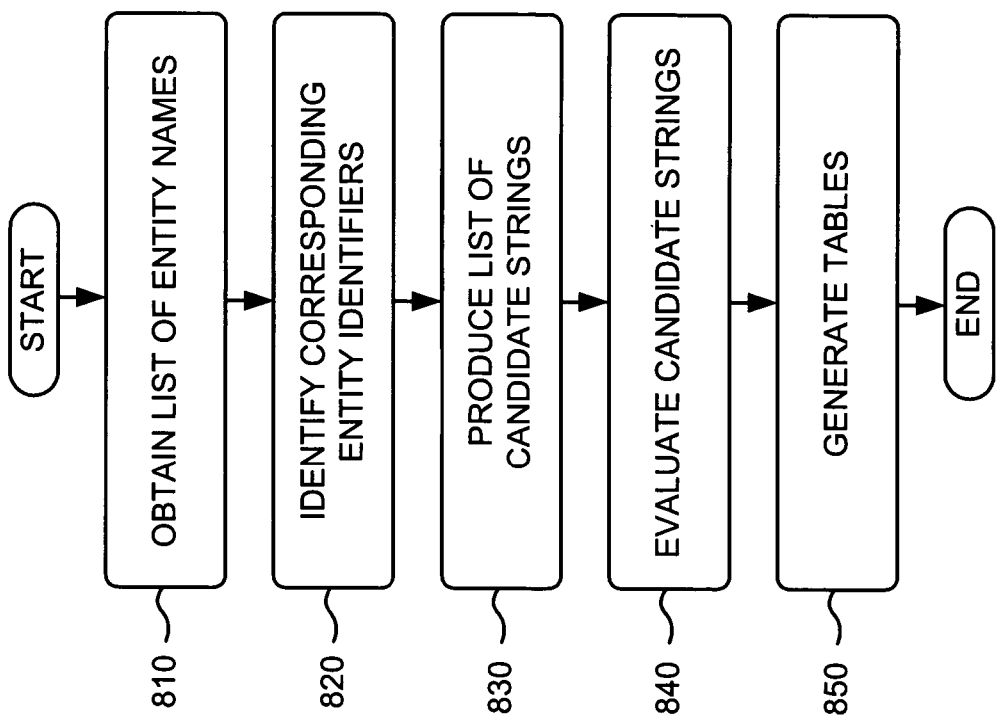
FIG. 8 is a flowchart of exemplary processing for generating the query rewrite and suggest query rewrite tables according to an implementation consistent with the principles of the invention.

FIG. 8 is a flowchart of exemplary processing for generating tables 330 and 340 (FIG. 3) according to an implementation consistent with the principles of the invention. Processing may begin with obtaining a list of entity names for a particular context (act 810). For each of the entity names, a corresponding entity identifier may also be identified (act 820). Several techniques exist for identifying entity names and/or entity identifiers for the list. For example, entity names and/or entity identifiers may be identified from online directories, lists, group postings, by analyzing a corpus of documents, etc.

A list of candidate strings may then be produced by transforming the entity names and/or entity identifiers (act 830). For example, the list of candidate strings for a particular entity name and its associated entity identifier may include the entity name as is, the entity identifier as is, the entity name without modifiers (e.g., "a," "the," "inc," "inc.," "co," and "co."), the entity name with spaces replaced with hyphens or underscores, and vice versa, the entity name without apostrophes, the entity name and/or entity identifier with "and" replaced with "&," and vice versa, the entity name and/or entity identifier without "and" and "&," the entity identifier without an initial "www." and/or a trailing ".com," and the entity identifier with a period with no spaces on either side of it replaced with spaces or deleted. Other or different transformations may also be used.

The candidate strings (i.e., each version of an entity name and/or entity identifier) may then be evaluated and used to form query rewrite table 330 and suggest query rewrite table 340 (acts 840 and 850). For example, query log 400 may be searched to identify all entries that include a particular candidate string in their query field 410. The identified entries may then be examined to determine which entity identifiers (e.g., domains, URLs, or category identifiers) were clicked for the corresponding search queries. The distribution of the clicks may be analyzed to, for example, determine whether the most-clicked entity identifier is the entity identifier that is supposed to correspond to this candidate string. If not, the candidate string can be ignored and the next candidate string selected for evaluation.

If the most-clicked entity identifier is the entity identifier that is supposed to correspond to this candidate string, then it may be determined whether the total number of clicks to the correct, most-clicked entity identifier exceeds a small threshold (e.g., 5). If the total number of clicks is below the threshold, then this candidate string can be ignored and the next candidate string selected for evaluation.

If the correct, most-clicked entity identifier has a total number of clicks above the threshold, then the distribution of how many clicks were associated with each entity identifier may be determined. If the distribution is "peaked" enough (e.g., most of the clicks were to the correct entity identifier and far fewer clicks were to other entity identifiers), then the candidate string may be added to query rewrite table 330. If the distribution is not peaked, but falls off much more slowly (e.g., other entity identifiers got nearly as many clicks), then the candidate string may be added to suggest query rewrite table 340. Some possible tests for determining peakedness have been described above.

Figure 9:
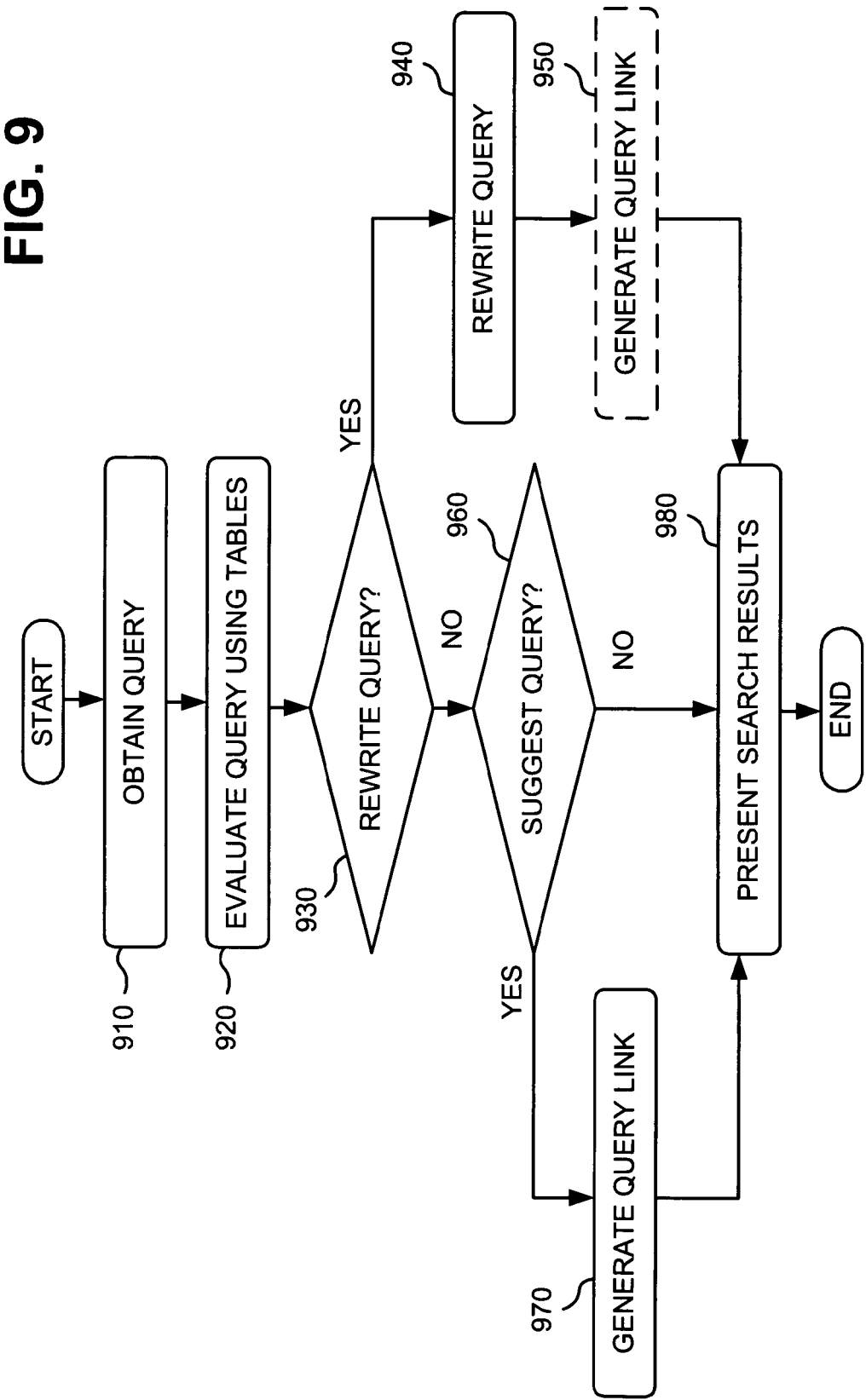
FIG. 9 is a flowchart of exemplary processing for selectively rewriting a query according to an implementation consistent with the principles of the invention.

FIG. 9 is a flowchart of exemplary processing for selectively rewriting a search query according to an implementation consistent with the principles of the invention. Processing may begin with receiving a search query from a user (act 910). The search query may contain one or more terms, which may or may not include the name of an entity.

The search query may be evaluated using query rewrite table 330 and/or suggest query rewrite table 340 (act 920). For example, the entries of query rewrite table 330 may be searched to determine whether a term (or a combination of terms) of the search query match a name string in string field 610 (FIG. 6). If a term (or terms) of the search query matches one of the name strings, then the query may be automatically rewritten (acts 930 and 940). For example, if the original query included "harry potter barnes & noble," then the query may be rewritten as "harry potter store:barnesandnoble" to indicate that the user intends to find products or information relating to Harry Potter on the Barnes & Noble web site and is not simply searching for documents containing the terms "harry," "potter," "barnes," "&," and "noble."

Optionally, a query link may be generated to offer the original query to the user, asking the user if the user intended a different search query than the automatically rewritten query (act 950). In this case, the query link may offer the original query of "harry potter barnes & noble" to the user.

If none of the terms of the search query match the name strings in query rewrite table 330, then the entries of suggest query rewrite table 340 may be searched to determine whether a term (or a combination of terms) of the query match a name string in string field 710 (FIG. 7). If a term (or terms) of the search query matches one of the name strings, then a query link may be generated (acts 960 and 970). The query link may offer a query rewrite to the user, asking the user if the user intended a different search query. For example, if the original query included "purse coach," then the query link may offer a rewritten query of "purse store: coach" (in the store context) to indicate that the user intends to find products or information relating to purses on the Coach web site and is not simply searching for documents containing the terms "purse" and "coach."

A search may then be performed based on the rewritten query, if applicable, or the original query, if applicable, to identify documents that are relevant to the rewritten/original query. For example, a repository of documents may be searched to identify documents that include one or more terms of the query. The resulting documents may form search results that may be presented to the user (act 980). In one implementation, the search results might take the form of links to the documents.

Automatic Query Rewrite Example—Store Context

Figure 10:
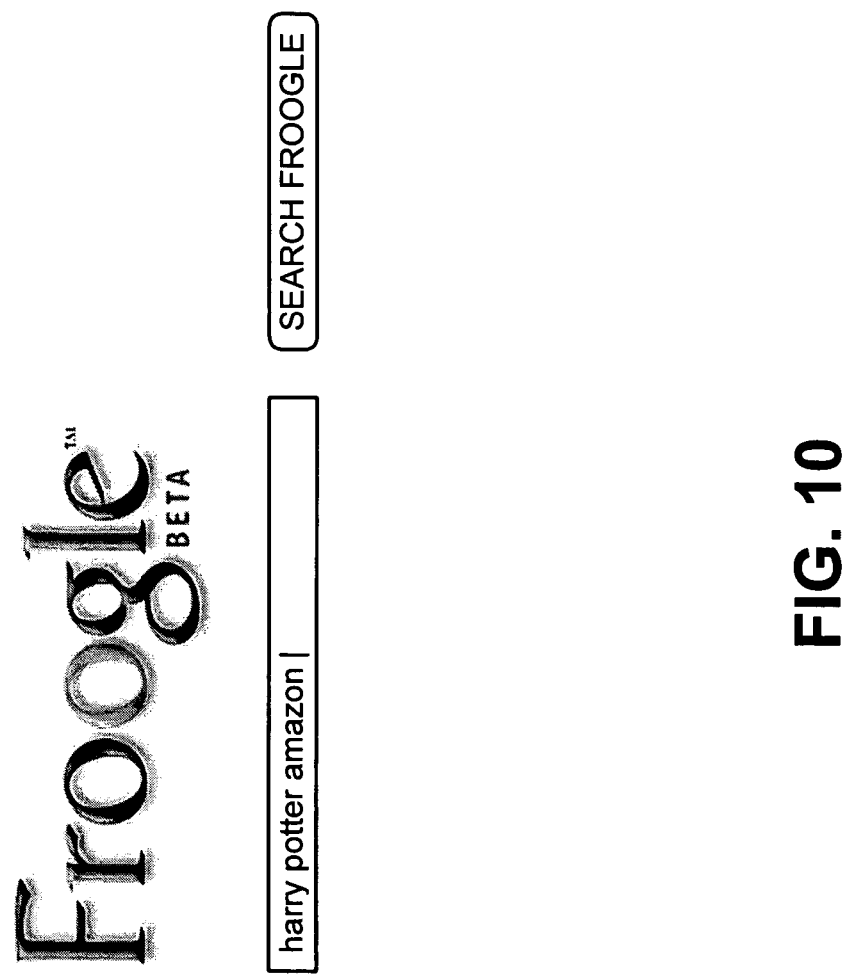

FIGS. 10 and 11 are diagrams of an automatic query rewrite example in the store context according to an implementation consistent with the principles of the invention. As shown in FIG. 10, a user may enter a search query via a graphical user interface associated with a search engine, such as search engine 125 (FIG. 1). In this example, the user enters the search query "harry potter amazon." Assume that the term "amazon" unambiguously identifies the store Amazon.com and, thus, is included as a name string in query rewrite table 330 (FIG. 3).

Search engine 125 may evaluate the terms of the search query based on query rewrite table 330 and suggest query rewrite table 340. In this case, search engine 125 finds that the term "amazon" appears in the query rewrite table 330.

Search engine 125 then rewrites the search query to "harry potter store:amazon," as shown in FIG. 11.

Search engine 125 performs a search of a repository for documents (e.g., products) associated with the store Amazon.com that are relevant to the rewritten query. There are many ways to determine document relevancy. For example, documents that contain one or more of the search terms of the rewritten query may be identified as relevant. Documents that include a greater number of the search terms may be identified as more relevant than documents that include a fewer number of the search terms.

Search engine 125 may then present the relevant documents to the user as search results. As shown in FIG. 11, each search result may include a link 1110 to a corresponding document, a price and store identifier 1120 associated with the document, and a brief description 1130 of the corresponding document. The search result may also include an image 1140 associated with the document, if available. Optionally, search engine 125 may also provide a link 1150 to the original query entered by the user. In this case, link 1150 may correspond to a query associated with a search for the search term "harry," the search term "potter," and/or the search term "amazon."

Suggest Query Rewrite Example—Store Context

Figure 12:
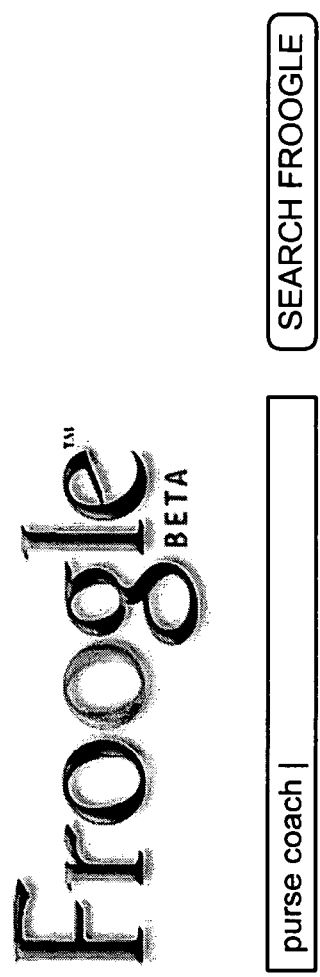

FIGS. 12-14 are diagrams of a query rewrite suggestion example in the store context according to an implementation consistent with the principles of the invention. As shown in FIG. 12, a user may enter a search query via a graphical user interface associated with a search engine, such as search engine 125 (FIG. 1). In this example, the user enters the search query "purse coach." Assume that the term "coach" is a generic term and ambiguously identifies the store Coach.com. Assume further that "coach" is included as a name string in suggest query rewrite table 340 (FIG. 3).

Search engine 125 may evaluate the terms of the search query based on query rewrite table 330 and suggest query rewrite table 340. In this case, search engine 125 finds that none of the search terms appear in query rewrite table 330, but that the term "coach" appears in the suggest query rewrite table 340. Search engine 125 then rewrites the search query as "purse store:coach" and generates a link 1310 ("Search Merchant Coach for Purse") to the rewritten query, as shown in FIG. 13.

Search engine 125 performs a search of a repository for documents (e.g., products) that are relevant to the original search query. As described above, there are many ways to determine document relevancy. For example, documents that contain one or more of the search terms of the original query may be identified as relevant. Documents that include a greater number of the search terms may be identified as more relevant than documents that include a fewer number of the search terms. In this case, search engine 125 searches for documents that include the search term "purse" and/or the search term "coach."

Search engine 125 may then present the relevant documents to the user as search results. As shown in FIG. 13, each search result may include a link 1320 to a corresponding document, a price and store identifier 1330 associated with the document, and a brief description 1340 of the corresponding document. Because the search was not limited to the store Coach, the search results are associated with a number of different stores (e.g., Yahoo! Auctions and Vendio). The search result may also include a link 1350 to additional documents associated with the store identified by store identifier 1330. The search result may further include an image 1360 associated with the document, if available.

If the user selects link 1310 associated with the rewritten query, search engine 125 performs a search of the repository for documents (e.g., products) associated with the store Coach.com that are relevant to the rewritten query. Search engine 125 may then present the relevant documents to the user as search results. As shown in FIG. 14, each search result may include a link 1410 to a corresponding document, a price and store identifier 1420 associated with the document, and a brief description 1430 of the corresponding document. The search result may also include an image 1440 associated with the document, if available. Optionally, search engine 125 may also provide a link 1450 to the original query entered by the user. In this case, link 1450 may correspond to a query associated with a search for the search term "purse" and/or the search term "coach."

Automatic Query Rewrite Example—News Context

Figure 15:
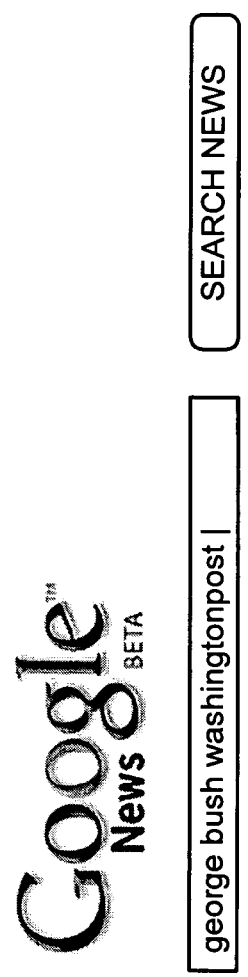

FIGS. 15 and 16 are diagrams of an automatic query rewrite example in the news context according to an implementation consistent with the principles of the invention. As shown in FIG. 15, a user may enter a search query via a graphical user interface associated with a search engine, such as search engine 125 (FIG. 1). In this example, the user enters the search query "george bush washingtonpost." Assume that the term "washingtonpost" unambiguously identifies the news source washingtonpost.com and, thus, is included as a name string in query rewrite table 330 (FIG. 3).

Search engine 125 may evaluate the terms of the search query based on query rewrite table 330 and suggest query rewrite table 340. In this case, search engine 125 finds that the term "washingtonpost" appears in the query rewrite table 330. Search engine 125 then rewrites the search query to "george bush source:washington_post," as shown in FIG. 16.

Search engine 125 performs a search of a repository for documents (e.g., news documents) associated with the source washingtonpost.com that are relevant to the rewritten query. There are many ways to determine document relevancy. For example, documents that contain one or more of the search terms of the rewritten query may be identified as relevant. Documents that include a greater number of the search terms may be identified as more relevant than documents that include a fewer number of the search terms.

Search engine 125 may then present the relevant documents to the user as search results. As shown in FIG. 16, each search result may include a link 1610 to a corresponding document, a news source identifier along with an indicator of when the document was created 1620, and a brief description 1630 of the corresponding document. The search result may also include links 1640 to other documents related to a topic of the document associated with link 1610. Optionally, search engine 125 may also provide a link 1650 to the original query entered by the user. In this case, link 1650 may correspond to a query associated with a search for the search term "george," the search term "bush," and/or the search term "washingtonpost."

Suggest Query Rewrite Example—News Context

Figure 17:
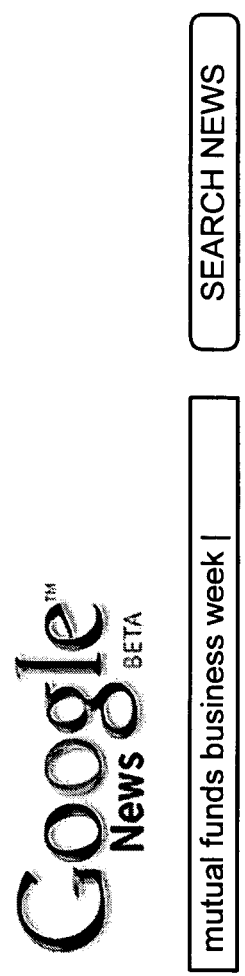
FIGS. 17-19 are diagrams of a query rewrite suggestion example in the news context according to an implementation consistent with the principles of the invention.
Figure 18:
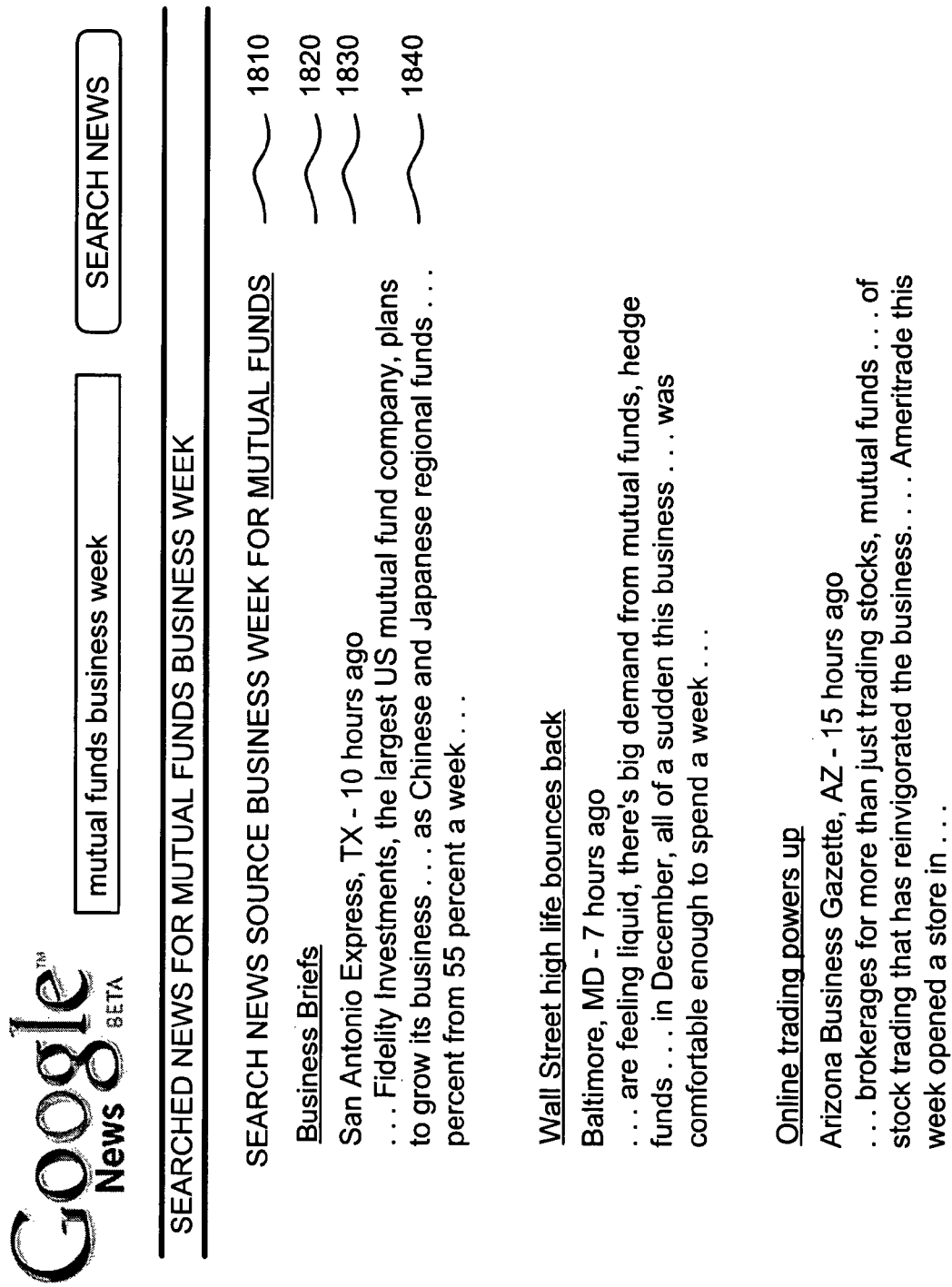
Figure 19:
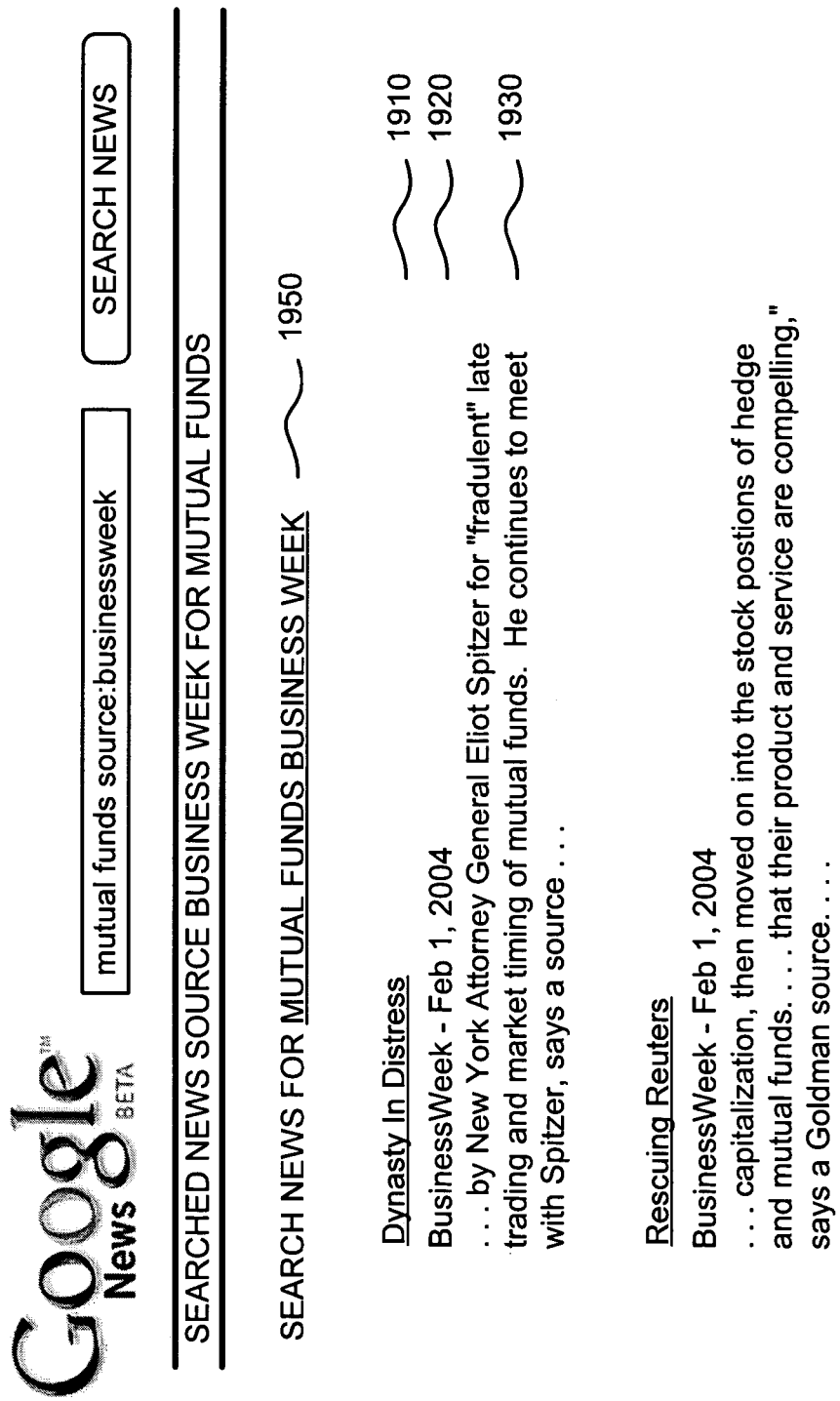

FIGS. 17-19 are diagrams of a query rewrite suggestion example in the news context according to an implementation consistent with the principles of the invention. As shown in FIG. 17, a user may enter a search query via a graphical user interface associated with a search engine, such as search engine 125 (FIG. 1). In this example, the user enters the search query "mutual funds business week." Assume that the terms "business week" are generic terms and ambiguously identify the news source businessweek.com. Assume further that "business week" is included as a name string in suggest query rewrite table 340 (FIG. 3).

Search engine 125 may evaluate the terms of the search query based on query rewrite table 330 and suggest query rewrite table 340. In this case, search engine 125 finds that none of the search terms appear in query rewrite table 330, but that the terms "business week" appear in the suggest query rewrite table 340. Search engine 125 then rewrites the search query as "mutual funds source:businessweek" and generates a link 1810 ("Search News Source Business Week for Mutual Funds") to the rewritten query, as shown in FIG. 18.

Search engine 125 performs a search of a repository for documents (e.g., news documents) that are relevant to the original search query. As described above, there are many ways to determine document relevancy. For example, documents that contain one or more of the search terms of the rewritten query may be identified as relevant. Documents that include a greater number of the search terms may be identified as more relevant than documents that include a fewer number of the search terms. In this case, search engine 125 searches for documents that include the search terms "mutual," "funds," "business," and/or "week."

Search engine 125 may then present the relevant documents to the user as search results. As shown in FIG. 18, each search result may include a link 1820 to a corresponding document, a news source identifier along with an indicator of when the document was created 1830, and a brief description 1840 of the corresponding document. Because the search was not limited to the news source Business Week, the search results are associated with a number of different news sources (e.g., San Antonio Express, Baltimore Sun, and Arizona Business Gazette).

If the user selects link 1810 associated with the rewritten query, search engine 125 performs a search of the repository for documents (e.g., news documents) associated with the news source businessweek.com that are relevant to the rewritten query. Search engine 125 may then present the relevant documents to the user as search results. As shown in FIG. 19, each search result may include a link 1910 to a corresponding document, a news source identifier along with a date indicator 1920 corresponding to the date on which the document was created, and a brief description 1930 of the corresponding document. Optionally, search engine 125 may also provide a link 1950 to the original query entered by the user. In this case, link 1950 may correspond to a query associated with a search for the search term "mutual," the search term "funds," the search term "business," and/or the search term "week."

CONCLUSION

Systems and methods consistent with the principles of the invention may rewrite search queries upon detection of the names of certain entities.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, it has been described that query rewrite table 330 and suggest query rewrite table 340 are generated and then used to assist the automatic rewriting of a search query or the generation of a suggestion link to a rewritten search query. In another implementation, the analysis that goes into generating tables 330 and 340 may be performed on-the-fly upon receipt of a search query from a user. In this case, query log 400 (FIG. 4) may be searched using the term(s) of the search query. The distribution of clicks and peakedness may then be determined in a manner similar to that described above. Analysis similar to that described above for storing the search term(s) in query rewrite table 330 or suggest query rewrite table 340 may be used to determine whether to automatically rewrite the query or generate a suggestion link to a rewritten query.

Further, different techniques may be used to determine what and whether to rewrite terms of search queries. One technique would be to create tables 330 and 340 by hand. Another general class of techniques would be to do a statistical analysis of any potential name based on a large corpus of text (possibly the repository of documents being searched) and determine whether the name is a generic term based on the variability of the context in which it appears or based on the relative number of times it appears in a known appropriate field (e.g., the store name field) rather than in the generic text of other more general fields, such as descriptions or the text body of an article. Combinations of these are also possible, such as using an automated approach followed by human evaluation and minor editing of the generated table entries.

Also, while series of acts have been described with regard to FIGS. 8 and 9, the order of the acts may be modified in other implementations consistent with the principles of the invention. Further, non-dependent acts may be performed in parallel.

In one implementation, server 120 may perform most, if not all, of the acts described with regard to the processing of FIGS. 8 and/or 9. In another implementation consistent with the principles of the invention, one or more, or all, of the acts may be performed by another component, such as another server 130 and/or 140 or client 110.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
receiving a search query;
determining that the received search query includes an entity name;

determining whether to rewrite the received search query based on information relating to prior searches involving the entity name;

in response to determining to rewrite the received search query:

rewriting the received search query;

performing a search based on the rewritten search query to obtain search results for the rewritten search query;

generating a query link to the received search query; and responsive to the received search query, presenting the search results for the rewritten search query and presenting the query link along with the search results for the rewritten search query, wherein selection of the presented query link causes another search to be performed using the received search query.

2. The method of claim 1, further comprising:

in response to determining not to rewrite the received search query:

determining whether to provide a suggestion of rewriting the received search query, as a rewriting suggestion, based on information relating to prior searches involving the entity name; and generating the rewriting suggestion when it is determined that the rewriting suggestion should be provided;

performing a search based on the received search query to obtain received search query search results; and presenting the received search query search results and presenting the rewriting suggestion along with the received search query search results.

3. The method of claim 2, wherein the rewriting suggestion includes a link to a rewritten search query.

4. The method of claim 2, wherein the determining whether to provide a suggestion of rewriting the received search query comprises:

identifying entity identifiers associated with documents that were selected in connection with the prior searches involving the entity name, determining a total number of selections for each of the identified entity identifiers, and determining that the rewriting suggestion should be provided when an entity identifier associated with the entity name receives a total number of selections greater than other ones of the identified entity identifiers.

5. The method of claim 1, wherein the determining whether to rewrite the received search query comprises:

identifying entity identifiers associated with documents that were selected in connection with the prior searches involving the entity name, determining a total number of selections for each of the identified entity identifiers, and determining that the received search query should be rewritten when an entity identifier associated with the entity name receives a total number of selections greater than other ones of the identified entity identifiers.

6. The method of claim 5, wherein the determining whether to rewrite the received search query further comprises:

determining whether the total number of selections for the entity identifier associated with the entity name is greater than a threshold, and determining that the received search query should not be rewritten when the total number of selections for the entity identifier associated with the entity name is not greater than the threshold.

7. The method of claim 1, wherein the determining whether to rewrite the received search query comprises:

identifying entity identifiers associated with documents that were selected in connection with the prior searches involving the entity name, determining a distribution of a total number of selections for each of the identified entity identifiers, and determining that the received search query should be rewritten when the distribution indicates that the total number of selections for an entity identifier associated with the entity name is peaked compared to the total number of selections for a subset of other ones of the identified entity identifiers.

8. The method of claim 1, wherein the rewriting the received search query comprises:

modifying the received search query to include a restrict identifier associated with the entity name.

9. The method of claim 1, wherein the performing a search based on the received search query comprises:

searching a repository of documents using the rewritten search query.

10. A system, comprising:

means for receiving a search query;

means for determining that the received search query includes an entity name;

means for determining whether to rewrite the received search query when the received search query includes an entity name;

means for rewriting the received search query in response to determining to rewrite the received search query;

means for performing a search based on the rewritten search query to obtain search results for the rewritten search query;

means for generating a query link to the received search query; and means for, responsive to the received search query, providing the search results for the rewritten search query and providing the query link along with the search results for the rewritten search query wherein selection of the provided query link causes another search to be performed using the received search query.

11. A system, comprising:

a memory to store information relating to prior searches; and a processor to:

receive a search query, determine that the received search query includes an entity name, determine whether to rewrite the received search query based on the information in the memory that involves the entity name, in response to determining to rewrite the received search query:

rewrite the received search query, perform a search based on the rewritten search query to obtain search results for the rewritten search query, generate a query link to the received search query, and responsive to the received search query, present the search results for the rewritten search query and present the query link along with the search results for the rewritten search query wherein selection of the query link causes another search to be performed using the received search query.

* * * * *